Nov. 21, 1967     G. W. ANDERSON ET AL     3,354,297
APPARATUS FOR MEASURING DYNAMIC CHARACTERISTICS OF
SYSTEMS BY CROSSCORRELATION
Original Filed Jan. 12, 1960     2 Sheets-Sheet 1

INVENTORS.
GEORGE W. ANDERSON
JOHN A. ASELTINE
GEORGE R. COOPER

BY THEIR ATTORNEYS.
HARRIS, KIECH, RUSSELL & KERN

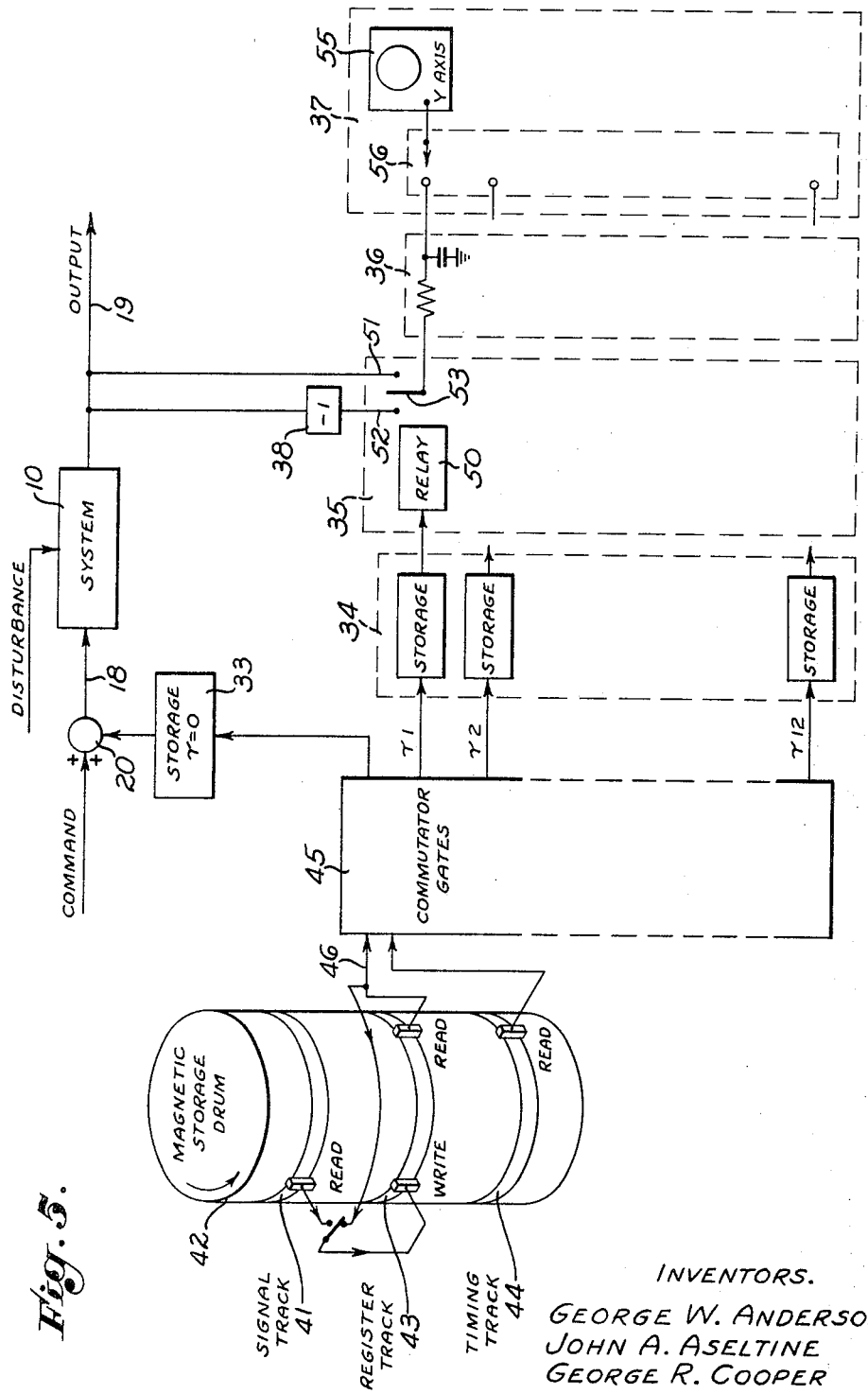

United States Patent Office 3,354,297
Patented Nov. 21, 1967

3,354,297
APPARATUS FOR MEASURING DYNAMIC CHARACTERISTICS OF SYSTEMS BY CROSSCORRELATION
George W. Anderson, Santa Ana, and John A. Aseltine, Los Angeles, Calif., and George R. Cooper, Lafayette, Ind., assignors to Ford Motor Company, Dearborn, Mich., a corporation of Delaware
Continuation of application Ser. No. 1,935, Jan. 12, 1960. This application Feb. 6, 1964, Ser. No. 343,917
5 Claims. (Cl. 235—181)

ABSTRACT OF THE DISCLOSURE

Apparatus for measuring dynamic characteristics of systems by crosscorrelation using a periodic, discrete-interval binary test signal having a nonasymptotic autocorrelation function of triangular form.

---

This application is a continuation of our now abandoned copending application Serial No. 1,935, filed Jan. 12, 1960, and entitled Crosscorrelator.

This invention relates to apparatus for measuring dynamic characteristics of systems. Typical examples of measurable systems according to the invention are machine tools with programmed automatic controls, chemical manufacturing processes, and oil refinery control systems. It is conventional to determine the dynamic characteristics of such systems by exciting the system with a sinusoidal or step function input and measuring the output response. However, this technique requires the system to be out of normal operation and it is often desirable to measure the dynamic characteristics of a system while in operation. This type of measurement provides a continuous check on the system's characteristics and does not require any loss of production time. It is essential that such measurements be made without disturbing the operation of the system and a general approach to this end using a crosscorrelation technique has been developed. A general description of crosscorrelation techniques may be found in a paper entitled "A Self-Adjusting System for Optimum Dynamic Performance," presented at the IRE national convention, March 25, 1958, and in the references cited therein.

In general a crosscorrelator should be able to compute the crosscorrelation function of an operating physical system without materially disturbing the system. Furthermore, the crosscorrelation computations should be immune to the effects of noise in the system, command signals, and parameter changes. The crosscorrelation function of a system can be determined from the impulse response of the system and the autocorrelation function of the input signal. When the input signal has a bandwidth considerably larger than that of the system under test, i.e., on the order of three to ten times larger, then its autocorrelation function will be effectively an impulse and the impulse response of the system will be equal to the crosscorrelation function. A determination of the crosscorrelation coefficient at a number of points in time will provide the impulse response of the system.

In its crudest form, a crosscorrelator may measure the input to the system and the output of the system and from these calculate the crosscorrelation function. Practically, this approach is very difficult since there is no control over the input signal.

Crosscorrelators have been developed in which the input or test signal is generated in the crosscorrelator and is injected into the system as an input in conjunction with other inputs to the system. The crosscorrelation between the test signal input and the system's output gives the desired impulse response measurement. The test signal source in such instruments usually generates a random noise of controlled magnitude and sufficient bandwidth to avoid disturbing the system under test. Such instruments suffer from a number of disadvantages, including the requirement of a random noise generator, and the requirement of large, long time constant filters to provide the necessary averaging.

Accordingly one object of the present invention to provide a new and improved crosscorrelator which is simpler in design and operation and which provides better performance than previously known instruments. Another object is to provide a crosscorrelator which does not require a random noise input signal. A further object is to provide a crosscorrelator which uses an input test signal that is periodic and binary in form rather than being random noise.

Summary

According to the invention apparatus is provided which utilizes a periodic, discrete-interval binary test signal to provide an autocorrelation function which has a triangular form, a controllable width, and which is nonasymptotic. The crosscorrelator utilizes an input signal which has an autocorrelation function that very nearly approaches the ideal impulse function.

The crosscorrelator includes a test signal source, means for coupling the test signal to the system being measured, means for generating a plurality of successively delayed versions of the test signal, a plurality of multipliers, each arranged to supply the product of one of the delayed signals and the system output, a plurality of low pass filters responsive to the product signals for producing a plurality of averaged product signals, and means for recording the averaged product signals. Each multiplier may be a binary device which is actuated by one of the delayed signals to couple either the system's output or the inverse of the system's output to an associated filter. The averaged product signals may be recorded for subsequent use, may be displayed for immediate inspection, or may be utilized in further circuitry for control purposes and the like.

The crosscorrelator may use a circulating shift register in the form of a memory drum which has a timing track in conjunction with a plurality of gates to provide a plurality of relatively long delayed outputs from a periodic signal which has a relatively large number of bits of information. In such apparatus ten seconds of delay can be provided in increments of one-hundreth of a second.

Drawings

In the drawing:

FIG. 5 is a block diagram showing a more detailed version of the system of FIG. 4.

Figure 1:
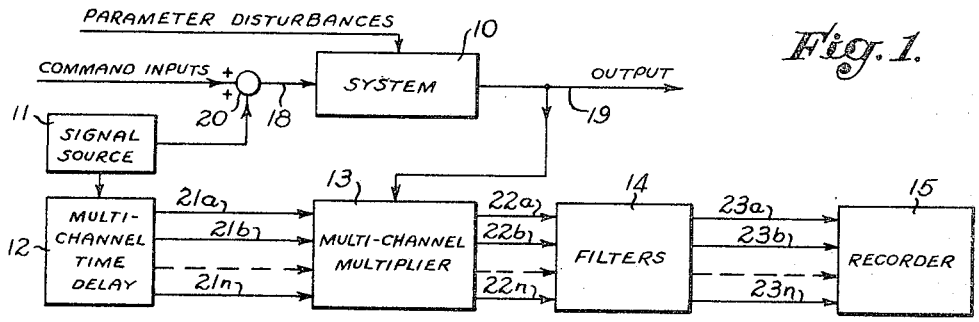
FIG. 1 is a block diagram of apparatus connected to measure the crosscorrelation function of a system.

FIG. 1 discloses a crosscorrelator suitable for use in measuring the dynamic characteristics of a system 10 while the system is in operation. The crosscorrelator includes a signal source 11, a delay unit 12, a multiplier unit 13, a filter unit 14, and a recorder 15. Typically, the system 10 may be an automatic machine tool which has one or more internal feedback loops and an input 18 and output 19. Command signals are coupled to the input 18 and the system may also be subject to parameter disturbances including noise, power source variations, changes in environmental conditions, and the like.

The signal source 11 generates a test signal that is supplied, along with the command inputs, to the system input 18 through a summing unit 20. The test signal is also coupled to the delay unit 12. The delay unit generates a plurality of successively delayed versions of the test signal on lines 21a, 21b, 21n. Each delay signal produces a point on the impulse response curve of the system being tested. The total number of delayed signals and their time spacing are selected to provide a suitable number of appropriately spaced points for the particular system under test. The multiplier unit 13 comprises a plurality of individual multipliers, each of which receives one of the delayed signals and the system output and produces a product signal on a corresponding one of the lines 22a, 22b, 22n. The filter unit 14 includes a plurality of low pass filters which produce a corresponding plurality of averaged product signals on lines 23a, 23b, 23n. The recorder 15 may be any of various conventional recording or indicating devices such as an $n$-channel pen recorder which produces continuous charts of each input, an oscilloscope with a suitable time base for displaying all of the points on the response curve, or a digital storage device which stores the outputs for further computation and control.

When any system is excited with a random input, its output and input will be correlated to an extent that depends in part upon the nature of the system. The relationship between this correlation between input and output (crosscorrelation) and the system's impulse response forms the theoretical basis for the present method of measuring impulse response. If the random input is sufficiently wide-band so that it may be considered to be white noise, then the crosscorrelation becomes the equivalent of the impulse response of the system. Hence, the system impulse response can be determined by computing the crosscorrelation between the system's output and a suitably wide-band random input. The apparatus of FIG. 1 performs this operation. When the autocorrelation function of the test signal input is sufficiently narrow compared to the impulse response of the system being measured, the average value of the multiplier output will correspond to the value of the impulse response at a particular time. In order to determine the impulse response at several different times, a plurality of different values of delay are used. The multiplier output also contains a random component which is filtered out in order to provide the desired average value. The system's output and hence the multiplier's output will also contain responses to the command inputs and the external disturbances. As far as the measurement of impulse response is concerned, these contributions merely represent more noise which can be reduced or substantially eliminated by filtering.

Figure 2:
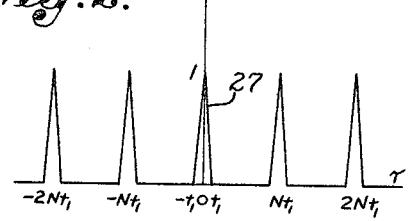
FIGS. 2 and 3 are graphs of autocorrelation functions.

It has been found that the mechanization of a crosscorrelator can be greatly simplified and the test results improved by utilizing a particular type of test signal rather than the pure random noise ordinarily contemplated for such apparatus. The test signal (not shown) is made binary in nature, having only two states of equal positive and negative amplitude about a zero reference. Also, the test signal is made a discrete-interval binary signal in which the transition times thereof are explicitly specified. This type of binary signal can be generated by sampling a very wide-band noise source every $t_1$ seconds and setting the signal equal to plus 1 if the sample is positive and minus 1 if the sample is negative. If the minimum interval width is $t_1$ seconds, the autocorrelation function of the discrete-interval binary signal will be a triangular shaped pulse such as the pulse 27 of FIG. 2. For small values of $t_1$, this autocorrelation function very closely approaches the ideal impulse input (a pulse of infinite magnitude and infinitely short duration with unit area).

An input noise sample of infinite duration or of a duration long relative to the other times in the system will also produce the single pulse autocorrelation function 27. Further simplifications in apparatus and improvements in performance are obtained by making the test signal of finite length and repeating it periodically. In particular, the size and complexity of the filters can be substantially reduced as the average value of the multiplier's output is obtained in a much shorter time with the periodic signal. The autocorrelation function of a periodic function is also periodic with the same period. Thus the discrete-interval binary signal discussed above which produced the autocorrelation function 27, when made periodic with a period of $Nt_1$, will have the autocorrelation function shown in FIG. 2. The periodicity will have no effect on the operation of the system if $Nt_1$ is greater than the length of the significant part of the impulse response of the system. Another feature of the particular test signal of the present invention is the fact that its autocorrelation function is not asymptotic, but drops sharply to zero in contrast to the random interval noise input which has an autocorrelation function with marked asymptotes.

Thus it is seen that a crosscorrelator can be implemented with a signal source which provides a discrete-interval binary and periodic test signal which has a triangular autocorrelation function. With this test signal, the multiplier instrumentation is very simple since the system output need by multiplied either by plus 1 or minus 1. Also the filter instrumentation is greatly simplified because the required averaging time is greatly reduced.

The signal source 11 may constitute a memory in which the discrete-interval binary signal is stored and read out periodically to the system's input and the delay unit. It should be noted that not every signal will produce the desired autocorrelation function and it is necessary to check the autocorrelation function of the selected signal before using the same in the apparatus. The trial and error approach to preparing a suitable signal can be tedious and time-consuming and a method of synthesizing a signal which will have the desired autocorrelation function has been developed.

Figure 3:
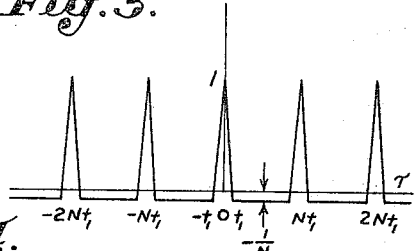

In particular, when N, the number of discrete intervals (bits) in one period, is a prime number, a test signal can be produced with the autocorrelation function shown in FIG. 3. When N is large (e.g., greater than 100), it will be evident that this autocorrelation function will be substantially the same as that of FIG. 2. N is selected to be a prime number of the form $4K-1$ where $K=1, 2, 3, \ldots$. Then the binary state for each interval can be determined by either of the following expressions in which the sequentially solved valves for $q_n$ represent the numbers of those intervals having a common binary state with the remaining intervals having the other binary state:

$$q_n = n^2, \text{ for } n^2 \text{ less than } N,$$

or $$q_{n+1} = q_n + 2n + 1, \text{ for } q_{n+1} \text{ less than } N$$

When $q_n$ or $q_{n+1}$ is greater than N, multiples of N may be substracted to provide a quantity less than N. The Nth interval can be either plus 1 or minus 1. In the autocorrelation function of FIG. 3, the last interval was minus 1. When the last interval is plus 1, the height of the horizontal portion of the curve will be plus 1 over N.

The following is a calculation of the numbers of the common intervals in the test signal for $N=7$ using the first formula $q_n = m^2$.

$q_n = n^2$, for $n^2$ less than 7. Hence $q_1=1$ and $q_2=4$. When $n^2$ is greater than 7, multiples of 7 are substracted from $n^2$ to obtain a quantity less than 7. Thus since $q_3 = 3^2 = 9$, $q_3 = 9-7 = 2$. The same results are obtained with the second formula (which is easier to mechanize) by obtaining the sequentially solved values for $q_{n+1}$, as follows:

$q_{n+1} = q_n + 2n + 1$, for $(q_{n+1})$ less than 7.

| $n$ | $q_n$ | $q_n+2n+1=q_{n+1}$ | |
| --- | --- | --- | --- |
| 1 | 1 | 1+2+1 | 4 |
| 2 | 4 | 4+4+1 | 9−7=2 |
| 3 | 2 | 2+6+1 | 9−7=2 |
| 4 | 2 | 2+8+1 | 11−7=4 |
| 5 | 4 | 4+10+1 | 15−14=1 |
| 6 | 1 | 1+12+1 | 14−14=0 |
| 7 | 0 | | |

Then the possible test signal sequences will have common binary terms for 1st, 2nd, and 4th intervals, and either binary term for the 7th interval, i.e.:

++−+−−−, or ++−+−−+ or the same sequences with all signs interchanged. Usually much larger values for N are used in actual systems.

It should be noted that the magnitude of this displacement from zero can be eliminated by making the last interval of the signal zero. However, this will make the test signal source ternary in nature, complicating the multiplication operation without producing any noticeable improvement in performance. Test signals with 251, 991 and 1019 intervals have been prepared using this approach. The ideal impulse is more closely approached by increasing the number of intervals per period and by shortening the duration of an interval. However, this increases the power requirements and complexity of the apparatus, and the selection of parameters for a particular embodiment is a comprise between performance and cost.

Figure 4:
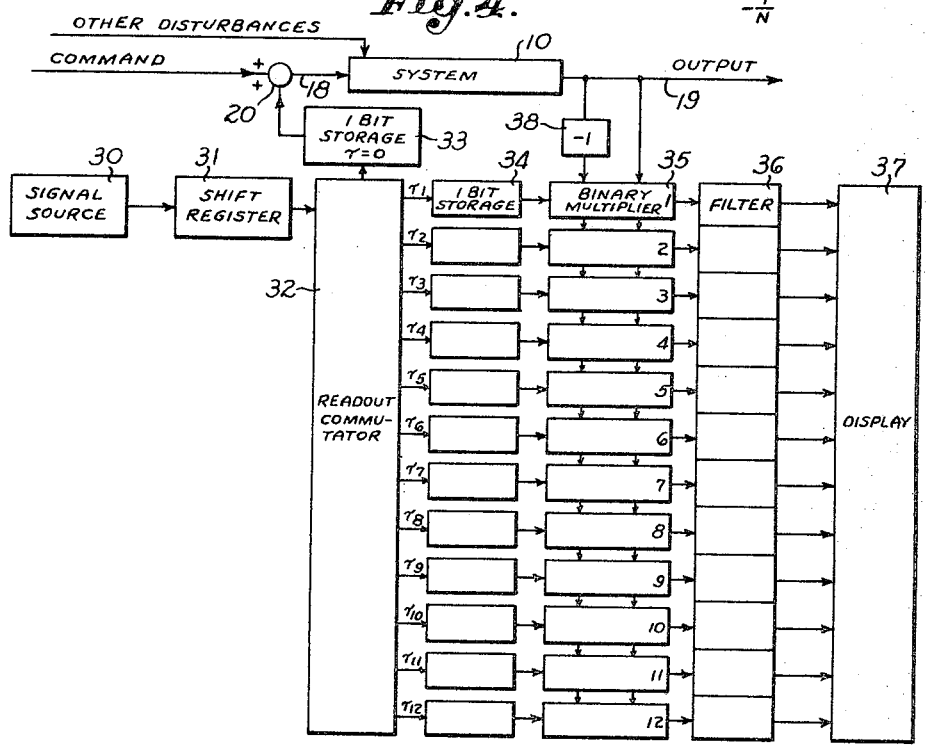
FIG. 4 is a block diagram of a specific embodiment of the system of FIG. 1.

FIG. 4 shows a specific embodiment of the crosscorrelator which is particularly adapted for use with a periodic, discrete-interval binary test signal, and FIG. 5 shows the embodiment of FIG. 4 in greater detail. The apparatus of FIG. 4 includes a signal source 30, a shift register 31, a read-out circuit 32, a test signal storage unit 33, twelve delay signal storage units 34, twelve multiplier units 35, twelve filters 36, a display unit 37, and an inverter 38.

As shown in FIG. 5, the signal source 30 and shift register 31 can be implemented as separate tracks on a continuously rotating magnetic drum 42.

The test signal may be stored on one track 41 of drum 42. A second track 43 on the drum is used as a precessing circulating register to provide the desired time delay. A timing signal is stored on a third track 44 of the drum. The timing signal actuates a plurality of gates 45 in sequence to connect the shift register's output 46 to the test signal storage unit 33 and the delay signal storage units 34 in sequence. The timing signal and the plurality of gates function as a stepping switch or commutator which distributes the output from the shift register to the appropriate storage units. The shift register track 43, commutator 45, and storage units 34 correspond to the multichannel time delay 12 in the embodiment of FIG. 1 as well as register 31, commutator 32 and storage units 34 of FIG. 4.

The operation of each binary multiplier 35 is equivalent to that of a conventional single pole double throw relay 50, although ordinarily electronic switching circuits are utilized. Thinking of the multiplier as a relay, the output 19 of the system is supplied noninverted to one pole 51 of the relay and an inverted version of output 19 produced by an inverter 38 is supplied to the other pole 52. The moving arm 53 of the relay is connected to an associated filter 36. The relay is actuated by the delayed signal from the associated storage unit 34. For example, if the delayed signal is a plus 1, the output of the system will be directly connected to the filter and if a delayed signal is a minus 1, the inverted output will be connected to the filter.

Similar operations occur in each of the twelve channels, thereby providing twelve averaged output signals to the display unit. In the particular embodiment shown, the display unit is a cathode ray oscilloscope 55 which is supplied with the twelve filter outputs via a selector switch 56. Swithch 56 cyclically connects each filter output in sequence to the Y axis and simultaneously connects to the X axis a deflection voltage of a value proportional to the delay of the particular signal on the Y axis, thereby providing a point plot of the response characteristic of the system along the X axis.

It should be noted that while the embodiment of FIG. 4 uses twelve delayed signals, the crosscorrelator of the invention is not limited to any particular number of delayed signals. In this particular apparatus, the periodic test signal had 991 intervals with the signal being repeated once every 9.91 seconds. The shift register was 991 bits in length and the shift command occurred every one hundredth of a second, hence requiring 9.91 seconds for the test signal to circulate through the register. The magnetic drum was driven at one hundred revolutions per second and the timing signal provided one commutation cycle per revolution. The natural frequencies of the system for which the crosscorrelator was built were expected to vary from two radians per second to twelve radians per second and an analysis of typical impulse responses in this range indicated that adequate test information could be obtained by utilizing twelve delay channels to provide twelve points on the impulse response curve with the delays ranging from 0.01 to 4.0 seconds. The majority of the points were concentrated in the lower time delay range.

In the actual instrument built as shown in FIG. 4, the delay unit was capable of providing delay of the order of ten or more seconds in increments of one hundredth of a second. This requires a shift register with the capacity to store of the order of one thousand bits of information. A conventional register of this size assembled from flip-flops or magnetic cores is expensive and a magnetic drum circulating register as shown in FIG. 5 is more economical. However, where the maximum delay time is short or the information rate is relatively low, a shift register utilizing flip-flops may be substituted for the magnetic drum, with the delayed signals taken at appropriate outputs of the register.

Although exemplary embodiments of the present invention have been disclosed and discussed, it will be understood that other applications of the invention are possible and that the embodiments disclosed may be subjected to various changes, modifications and substitutions without necessarily departing from the spirit of the invention.

We claim as our invention:

1. A test signal source for a crosscorrelator for measuring the impulse response of a system and including a signal delay unit, the combination of:
   means for producing a periodic electrical pulse train having N discrete intervals, wherein N is a prime number of the form $4K-1$, with $K=1, 2, 3, \ldots$, and where the sequentially solved values for where $q_n$ define the intervals having one binary state with the remaining intervals having the other binary state and with the last interval having either stater, with $q_n = n^2$ for $n^2$ less than N, and for $n^2$ greater than N, $q_n = n^2 - xN$, where $x = 1, 2, 3, \ldots$, and
   means for coupling said pulse train to the system as an input and to the delay unit as an input.

2. In a test signal source for a crosscorrelator for measuring the impulse response of a system and including a signal delay unit, the combination of:
   a magnetic drum having first, second and third tracks, with a discrete-inteval binary test signal stored on said first track and a timing signal stored on said second track;
a precessing circulating register using said third track with said test signal as an input;
a first read circuit for said third track;
a second read circuit for said second track; and
means for coupling said read circuit outputs to the signal delay unit.

3. In a test signal source for a crosscorrelator for measuring the impulse response of a system and including a signal delay unit, the combination of:
means for producing a discrete-interval binary electrical pulse train that is periodic with the period divided into a prime number of equal intervals; and
means for coupling said pulse train to the system as an input and to the delay unit as an input.

4. In a test signal source for a crosscorrelator for measuring the impulse response of a system and including a signal delay unit, the combination of:
means for producing an electrical pulse train having an autocorrelation function having the form of an isosceles triangle; and
means for coupling said pulse train to the system as an input and to the delay unit as an input.

5. A test signal source for a crosscorrelator for measuring the impulse response of a system and including a signal delay unit, the combination of:
means for producing a discrete-interval binary and periodic electrical pulse train; and
means for coupling said pulse train to the system as an input and to the delay unit as an input.

References Cited
UNITED STATES PATENTS

| | | |
|---|---|---|
| 2,958,039 | 10/1960 | Anderson. |
| 3,046,545 | 7/1962 | Westerfield. |
| 2,177,347 | 4/1965 | Cowley _____ 235—181 X |
| 3,212,091 | 10/1965 | Bissett et al. _____ 235—181 X |

OTHER REFERENCES

Anderson et al.: "A Self-Adjusting System For Optimum Dynamic Performance," IRE National Convention Record, vol. 6, part 4, March 1958; pp. 182–190.

MALCOLM A. MORRISON, *Primary Examiner.*

J. RUGGIERO, *Assistant Examiner.*

UNITED STATES PATENT OFFICE
CERTIFICATE OF CORRECTION

Patent No. 3,354,297            November 21, 1967

George W. Anderson et al.

It is hereby certified that error appears in the above numbered patent requiring correction and that the said Letters Patent should read as corrected below.

Column 4, line 75, for "$q_n=m^2$" read -- $q_n=n^2$ --; column 6, line 11, for "Swithch" read -- Switch --; line 63, strike out "where".

Signed and sealed this 11th day of February 1969.

(SEAL)
Attest:

Edward M. Fletcher, Jr.            EDWARD J. BRENNER
Attesting Officer            Commissioner of Patents